United States Patent

Duque-Anton et al.

[11] Patent Number: 5,835,849
[45] Date of Patent: Nov. 10, 1998

[54] CELLULAR MOBILE RADIO SYSTEM COMPRISING SUB-CELLS

[75] Inventors: Jesus M. Duque-Anton; Dietmar W. Kunz; Bernhard J. Rüber, all of Nürnberg, Germany

[73] Assignee: U.S. Philips Corporation, New York, N.Y.

[21] Appl. No.: 544,571

[22] Filed: Oct. 18, 1995

Related U.S. Application Data

[63] Continuation of Ser. No. 101,325, Aug. 2, 1993, abandoned.

[30] Foreign Application Priority Data

Aug. 4, 1992 [DE] Germany ................... 42 25 685.2

[51] Int. Cl.[6] ................ H04Q 7/22; H04Q 7/36
[52] U.S. Cl. ............... 455/33.1; 455/34.1; 455/56.1; 455/62; 379/59
[58] Field of Search ................... 455/33.1–33.4, 455/34.1, 34.2, 53.1, 54.1, 56.1, 54.2, 67.1, 62; 379/58–60, 63

[56] References Cited

U.S. PATENT DOCUMENTS

| | | | |
|---|---|---|---|
| 5,212,805 | 5/1993 | Comroe et al. ............... | 455/33.1 |
| 5,235,633 | 8/1993 | Dennison et al. ............... | 379/60 |
| 5,241,685 | 8/1993 | Bodin et al. ............... | 455/54.2 X |
| 5,247,699 | 9/1993 | Hartman ............... | 455/33.1 |
| 5,278,991 | 1/1994 | Ramsdale et al. ............... | 455/33.2 |
| 5,289,527 | 2/1994 | Tiedemann, Jr. ............... | 455/54.2 X |
| 5,293,643 | 3/1994 | Israelsson ............... | 455/56.1 X |

FOREIGN PATENT DOCUMENTS

| | | |
|---|---|---|
| 0202485 | 11/1986 | European Pat. Off. . |
| 490554 | 6/1992 | European Pat. Off. ............... 379/59 |
| 9010342 | 9/1990 | WIPO . |
| 9118450 | 11/1991 | WIPO . |

OTHER PUBLICATIONS

"Channel Segregation, A Distributed Adaptive Channel Allocation Scheme for Mobile Communication Systems", by Furuya et al, (undated published paper), related to EP 0,202,485, published Nov. 26, 1986.

"Reuse Partitioning in Cellular Systems", by S. Halpern, 33rd IEEE Vehicular Technology Conference, May 1983, pp. 322–327.

*Primary Examiner*—Chi H. Pham
*Attorney, Agent, or Firm*—Arthur G. Schaier

[57] ABSTRACT

A cellular mobile radio systems includes fixed stations and mobile stations, a radio cell being subdivided into sub-cells and each sub-cell being assigned its own allocation of radio channels. The values of radio parameters of the fixed stations are measured and evaluated for assigning a mobile station to a sub-cell. To achieve an additional increase of the radio channel capacity of such system, a position vector is assigned to each respective mobile station which is derived from the measured parameters. A mobile station is then assigned to a specific sub-cell on the basis of its position vector.

13 Claims, 5 Drawing Sheets

| K(i) | K'(i) |
|---|---|
| 0 0 0 0 | 1 1 1 1 |
| 0 0 0 1 | 0 0 0 1 |
| 0 0 1 0 | 0 0 1 0 |
| 0 0 1 1 | 1 1 1 1 |
| 0 1 0 0 | 0 1 0 0 |
| 0 1 0 1 | 1 1 1 1 |
| 0 1 1 0 | 1 1 1 1 |
| 0 1 1 1 | 1 1 1 1 |
| 1 0 0 0 | 1 0 0 0 |
| 1 0 0 1 | 1 1 1 1 |
| 1 0 1 0 | 1 1 1 1 |
| 1 1 0 0 | 1 1 1 1 |
| 1 1 0 1 | 1 1 1 1 |
| 1 1 1 0 | 1 1 1 1 |
| 1 1 1 1 | 1 1 1 1 |

FIG.3

CELLULAR MOBILE RADIO SYSTEM COMPRISING SUB-CELLS

This is a continuation of application Ser. No. 08/101,325, filed on Aug. 2, 1993 now abandoned.

BACKGROUND OF THE INVENTION

1. Field of the Invention

The invention relates to a cellular mobile radio system comprising fixed stations and mobile stations, in which a radio cell is subdivided into sub-cells and each sub-cell can be assigned its own selection of radio channels, radio parameters of the fixed stations being measured and evaluated for assigning a mobile station to a sub-cell. The invention likewise relates to a control and evaluation unit for use in such a mobile radio system as well as fixed stations for use in such a radio system.

2. Description of the Related Art

Mobile radio systems for covering a rather large coverage area have been designed as cellular radio networks for a long time. In each cell of such a radio network there is at least one fixed base station which maintains the radio connection to the mobile stations located in its radio cell. To make the frequency band of each radio system accessible to as large a number of subscribers as possible in the whole mobile radio system, great importance is attached to the network planning.

For the radio network planning a limited number of radio channels from the total number of available radio channels is assigned to each fixed station. In adjacent radio cells different radio channels are used, so that a mutual interference of the radio channels can be avoided. Due to the limited number of frequency bands the radio channels in the whole radio network, however, are to be re-used in different cells to obtain a maximum subscriber capacity. The proportion of the total number of radio cells to the number of radio cells with identical frequencies is designated here as the re-use factor.

From the article "REUSE PARTITIONING IN CELLULAR SYSTEMS", Samuel W. Halpern, 33th IEEE Veh. Tech. Conf., May 1983, pp. 322–327 is known a concept for cellular radio systems in which the available radio channels are used with different re-use factors to enhance the capacity of the radio system. For the assignment of a radio channel to a mobile radio station, the quality of a received signal is measured. A radio channel from the group of radio channels having the lowest re-use factor is assigned to mobile stations having the best received signal quality, whereas a radio channel from the group of radio channels having the highest re-use factor is assigned to mobile radio stations having the worst received signal quality. As a result, the area of a radio cell is subdivided into sub-cells with different re-use factors. Assuming ideal wave propagation conditions, the sub-cells formed in this manner consist of mutually concentric circular areas.

In WO 91/18450 this principle is taken up according to which a mobile station not only measures the received field strength of its own fixed station, but also the received field strengths of adjacent fixed stations. An interference gradient is determined from these measured values, whilst the mobile station of is assigned to one of the radio channel groups on the basis of this gradient, the difference between the radio channel groups being the re-use factors.

The assignment effected in this way ideally takes into consideration the found interference situation of a mobile station. Since all the measured values are combined to a single value, the interference gradient, a fast computability of this value is guaranteed. Alternatively, due to the wave propagation conditions to be found, there may be radio locations having the same interference gradients, which are in fact spatially wide apart.

A prerequisite for the above concept of sub-cells is a careful and expensive planning of the radio network with the different re-use factors being taken into consideration.

Such a planning first begins with devising a channel distribution plan. For the devising of a channel distribution plan the channel need of each radio cell is to be taken into consideration. The channel need of the radio cell depends on the size of the radio cell and the total amount of radio traffic to be expected locally. For example, within the locality of a large city, more radio channels are needed than in a purely rural area. Partly for this reason radio cells of varying sizes are already used which make it possible in so-called small cells when there is a reduced transmitter power to re-use the radio channel at an already smaller distance from the small cell.

The distance these radio cells are to be kept apart to avoid radio interference depends on many factors. These factors are, for example, the transmitter power and the conditions of radio wave propagation which are constituted by shadows, bends, scatterings, reflections and multipath propagation on the radio transmission path.

When radio cells are planned, topographical data (such as, differences in height, buildings and so on) are taken into consideration by means of statistical methods or data are determined via measuring rides with an instrument car. By implementing methods such as, for example, graph colouring, mutually interfering radio channels are assigned to radio cells which are sufficiently wide apart.

WO 90/10342 has disclosed a method of radio cell planning, according to which field strength and interference measurements are made in the planning phase with instrument cars especially made for this purpose, whose results are stored in a data bank. To each radio cell are assigned a number of radio channels which correspond to the estimated maximum traffic load to be expected. On the basis of the measurement results an exclusion matrix is then computed which reflects the interaction between the individual radio cells. In an iterative assignment algorithm the radio channel assignment is effected in random order. If no complete channel assignment can be effected in this manner, a new attempt is made in any one of said steps.

Therefore, with these channel assignment methods a specific number of radio channels is fixedly assigned from the start to each radio cell or each radio channel group respectively, which channels have their own re-use factor. When a limited number of channels is available, the increase of the number of radio channels assigned to a radio cell is always at the cost of the available channels in the adjacent radio cells. Due to the further increasing need for mobile communication, both the already existing mobile radio networks and those being laid out will in the short or longer run reach their capacity limits.

Only by the simplifications realized on the basis of statistics can the planning according to known methods be kept within justifiable limits. But especially with small cells and the smallest cells the statistical simplifications are no longer tolerable because the computed data become increasingly unreliable.

Even making relatively costly measuring rides in the planning phase can only partly eliminate the known disadvantages. For example, with measuring rides the traffic structure appearing when the mobile radio system is in operation can be anticipated only insufficiently.

SUMMARY OF THE INVENTION

It is an object of the invention to try and achieve an increase of the radio channel capacity of a mobile radio system of the type defined in the opening paragraph in a most simple manner.

This object is achieved in that a position vector assigned to each respective mobile station is derived by combining the measured values of radio parameters of the fixed stations, and the associated mobile station is assigned to a specific sub-cell on the basis of the respective position vector.

When the measured values are combined to a position vector, it is possible with relatively little circuitry and cost to achieve a better resolution of the radio location of a mobile station. Whereas the form of sub-cells which are formed by a gradient on the basis of an assignment, depends solely on the propagation conditions found in the radio network, the implementation of a position vector makes it possible to give the sub-cells a substantially arbitrary form. As a result, sub-cells formed in this manner as opposed to sub-cells of the same radio cell and as opposed to sub-cells in other (adjacent) radio cells, depending on the parameters used for the classification, can be demarcated better, either with respect to distance or with respect to their interference behaviour.

This is at the expense of slightly more circuitry and cost, it is true, for computing an assignment of the formed position vector to one of the provided sub-cells, but it has the enormous advantage that the topographical and morphological properties found in every radio cell, possibly even properties annoying per se, can be used to form sub-cells which merely by their topographical and morphological properties are mutually demarcated in a natural way. Thus, any additional technical circuitry, for example, a subdivision of the radio cell into sectors with directional aerials, additional small cells and smallest cells may be dropped. In addition, the demarcation of the sub-cells which is oriented to the natural conditions, surprisingly leads to the effect that all the radio channel groups of one of the sub-cells can have the same re-use factor and that nevertheless an increase of capacity is obtained. This is further of special advantage in that the planning of the radio channel groups can be simplified considerably and still the overall capacity of the radio network can be increased.

Preferably, the subdivision of a radio cell into sub-cells is made in such a way that similar radio conditions can be found in a sub-cell. A sub-cell can, but need not necessarily, correspond to a specific local area of the radio cell. Still it is possible with the position vector to spatially distribute radio locations that have the same interference gradient and assign them to different sub-cells.

The following values can be measured to determine suitable radio parameters, for example, bit and frame error rate, signal-to-noise ratio, actual channel occupancy, distance between fixed station and mobile station, etc. Satisfactory results can be obtained by using only the signal strength as a radio parameter. Preferably, however the measured signal strengths can then be combined into a signal strength vector, for example, the first element of such signal strength vector denoting the signal strength of a mobile station's own fixed station and the other elements of the vector denoting the signal strengths of the other fixed stations.

It is particularly advantageous to express the measured signal strengths of the adjacent fixed stations in proportion to the measured signal strength of the fixed station of the mobile station's own radio cell. As a result, information is obtained about the interference situation at an individual mobile station. If logarithmic values are given to the measured signal strengths, a ratio vector is obtained by subtracting the first element of the signal strength vector from all the other elements. Since this ratio vector reflects the situation of interference at the mobile radio station, this vector will be designated as interference vector in the following.

The assignment of a mobile station to a sub-cell may in this case be effected on the basis of a classification of the interference vectors. Methods which are statistical in principle (for example, "regression analysis") or also methods from neural network theory (for example, "learning vector quantization") are suitable for this classification.

Of particular advantage for the classification is a comparison of the proportioned signal strengths with a threshold value that depends on the radio system.

This threshold value that depends on the radio system is, for example, the maximum permissible common channel interference. When this threshold value is exceeded, there is probably an interference, which interference is unlikely when the threshold value is fallen short of. Depending on whether the threshold value is exceeded or fallen short of, two messages "interference" and "no interference" can occur. During a call it is thus possible to make a compatibility vector for each mobile station.

All the mobile stations within a radio cell that have the same compatibility vector are assigned to one sub-cell. By means of assignment Tables it is also possible to combine a plurality of mutually different compatibility vectors to a sub-cell. In this manner a plurality of sub-cells having a comparable interference situation can be combined. This is advantageous, for example, when several sub-cells having comparable interference situations have only a small traffic load. Combining these comparable sub-cells can produce sub-cells that have substantially the same traffic load, as a result of which the available number of channels can be used evenly and thus better.

By measuring the traffic load and using the measurement results to change the assignment Table, the combination of sub-cells can be adjusted to the actually occurring traffic load.

The use of compatibility vectors for classifying the sub-cells is advantageous in that it reflects in an extremely simple manner the overall active noise information. Active noise information is understood to mean the combination of all undesired influences on the mobile station under consideration caused by other fixed stations. Conversely, passive noise information is understood to mean the combination of all undesired influences on other fixed stations which are caused by the mobile station under consideration.

By collecting all the compatibility vectors, for example, in a central evaluation unit, the passive noise information can be obtained. In this manner all the information concerning channel compatibility among the sub-cells is obtained by way of a compatibility matrix.

An even greater network flexibility is achieved with an adjustable threshold value.

For each threshold value and for each sub-cell there are only a limited number of available radio channels that meet the radio quality standards determined by the threshold value. The radio quality in a sub-cell can thus be adjusted by reducing or increasing the threshold value. When there is little radio traffic, for example, at night, a high radio quality can be achieved by increasing the threshold value. If radio traffic so requires, for example, in periods of more radio traffic, the capacity of a radio cell can be enlarged again by reducing the threshold value with a reduced radio quality.

A change of the threshold value also changes the virtual size of a sub-cell and via the size of the sub-cells also the number of sub-cells present in a radio cell. The size or number respectively, of sub-cells can thus be adjusted to the network requirements with relatively simple means. It is possible, for example, to actually terminate the existence of specific cells whose traffic load is very small, by means of an overproportional threshold value. To ensure a proper radio operation, the radio traffic of a sub-cell which actually no longer exists is to be assigned to another sub-cell by means of suitable measures, for example, by means of assignment Tables.

A decisive advantage of such a radio network is that a planning of small and smallest cells that have unreliable data can be avoided. An adjustment of the sub-cells in response to the actual interference situation and the actual traffic load can be performed autonomously for each radio cell while the network is in operation.

Fixed channel lists can be made per sub-cell by accordingly adapted methods of the conventional radio network planning such as, for example, graph colouring, simulated annealing, and so on. With the current channel need the assignment of an arbitrary channel appears from the relevant sub-cell list.

However, also dynamic channel assignments can be used which do not work with a compatibility matrix, but which use the cell information differently for channel assignment. All these methods can be modified in this respect in that the sub-cell information is used instead of the radio cells. Such a dynamic channel assignment method is, for example, the channel segregation method by Furuya and Akaiwa, "Channel Segregation, A distributed Adaptive Channel Allocation Scheme for Mobile Communication Systems" (undated published paper), and the related EP 0,202,485, published Nov. 26, 1986.

A further embodiment of the cellular mobile radio system provides that the assignment parameters are collected and evaluated so that the assignment of the radio channels, size and number of sub-cells is changed on the basis of the evaluated data.

The collection and evaluation of the assignment parameters produce, in a much better way than with advance computations, the actual instantaneous channel need and, in good approximation, the actual interference situation in the whole cellular mobile radio system. By evaluation and reassignment of the sub-cells and of the radio channels on the basis of the evaluated data, the mobile radio system can adjust to each need for a channel. This makes it also possible to choose such small-size sub-cells for which size a modelling or advance computation respectively, has not been practically possible so far.

BRIEF DESCRIPTION OF THE DRAWINGS

The invention will now be further described and explained with reference to the embodiments shown in the drawing Figures, in which:

FIG. 3 shows an assignment Table of compatibility vectors for classified sub-cells.

DESCRIPTION OF THE PREFERRED EMBODIMENTS

Figure 1:
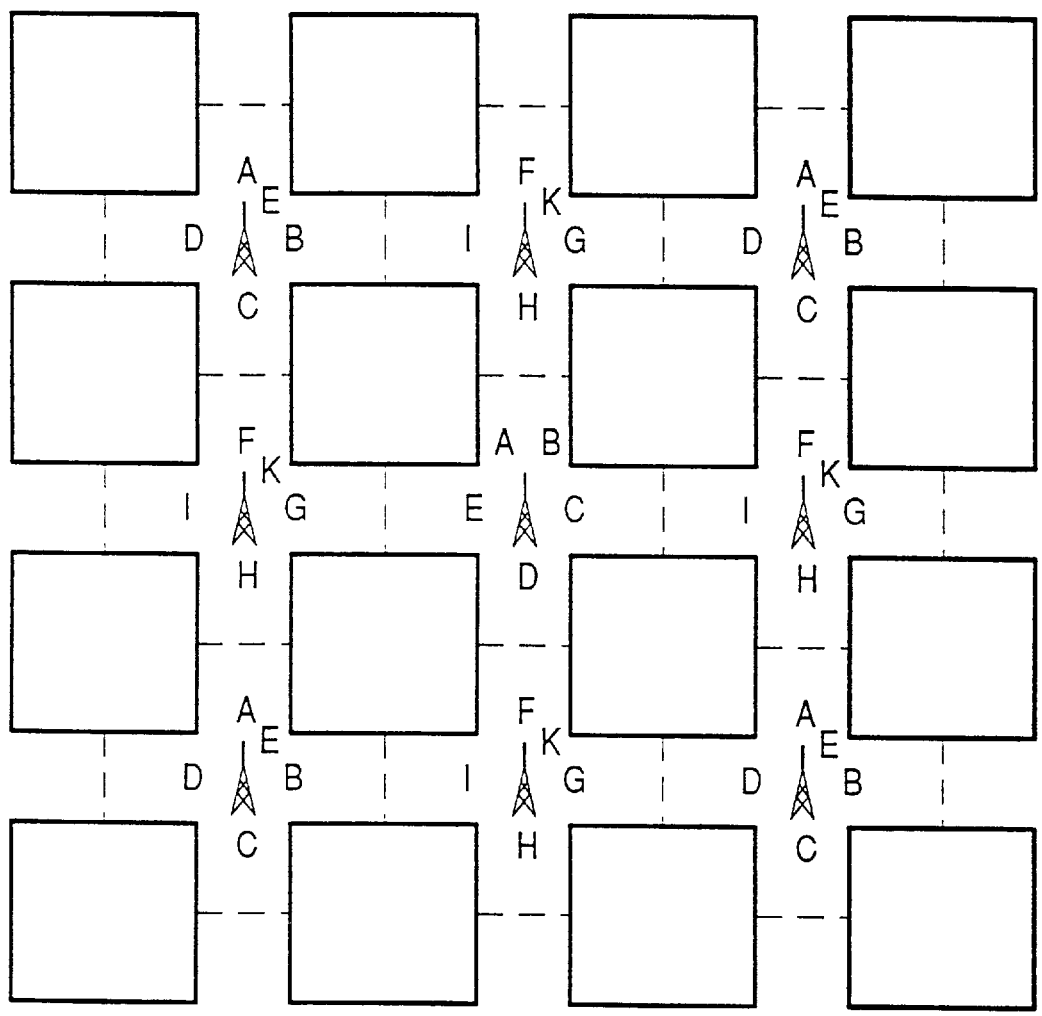
FIG. 1 shows the so called "Manhattan" model with uniform radio channel distribution.

FIG. 1 shows a model of a mobile radio system realized in a large city. The fixed stations are arranged at the crossroads of horizontally and vertically running streets. Straight lines of buildings which form a shield against radio contact between streets running in parallel are arranged on the sides of the streets. The radio waves can thus propagate only in the direction of the streets. Since such an infrastructure can be found, for example, in Manhattan, this model is called the Manhattan model.

On the basis of this model the advantage of the formation of sub-cells by the use of a position vector can be shown distinctly. However, the invention is not generally restricted to this model. Since the invention takes advantage of generally occurring disturbances with respect to conditions of radio propagation, the presence of obstacles such as, for example, shielding buildings and so on have a favourable effect on the invention.

In the model represented in FIG. 1 each fixed station has eight adjacent fixed stations in the horizontal, vertical and diagonal directions. Due to the wave propagation in horizontal and vertical directions the vertically and horizontally adjacent fixed stations cannot employ the same radio channels. As a result, the number of interfering adjacent transmitters in this model is reduced to four. Due to the shielding effect of the buildings, already the diagonally adjacent radio cells can again employ the same radio channels. For example, if one starts from fifty radio channels needed per radio cell, a total of ten different radio channel groups A . . . K having each 10 separate radio channels is provided for this model. (The effect that diagonally arranged fixed stations are not mutually interfering can already be taken into consideration in the planning phase).

Generally, there are two different options to collect the measurement data from which the position vector of a mobile station is formed. On the one hand, the mobile stations themselves can collect all the data necessary for the computation of their position vectors and transfer them to the fixed station; on the other hand, the neighbouring fixed stations can also measure each individual mobile station and transfer these data to an evaluation unit.

In the exemplary preferred embodiment the first option is used, which is highly advantageous in cellular mobile radio systems in which each fixed station radiates at least one organization channel with maximum transmitter power. Radiating an organization channel with maximum transmitter power ensures that this organization channel can also be received with still sufficient field strength by the mobile stations in adjacent cells.

In a cellular radio system such organization channels are used for exchanging organization data between a fixed station and the subscribers in the radio cell, for example, for transmitting a wish to establish a telephone connection or for agreeing upon an assigned voice channel. Depending on their function, such organization channels are also referenced control channels.

Figure 5:
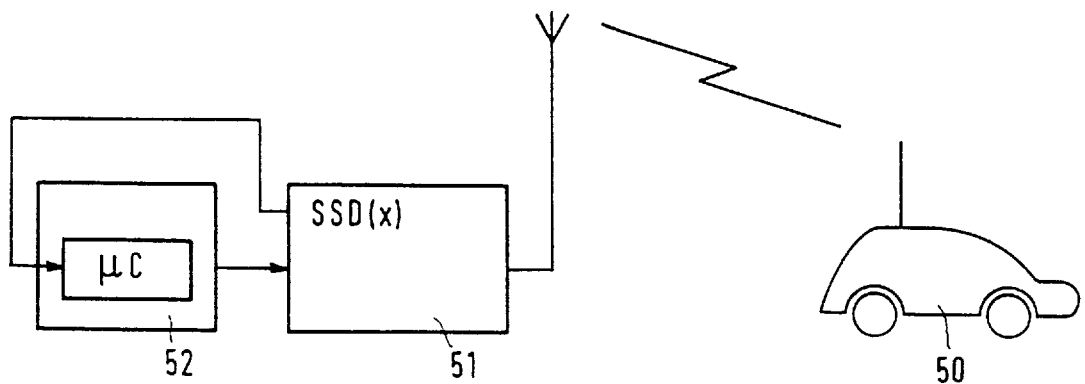

In the embodiment as shown in FIG. 5, once a mobile station has announced itself to a fixed station, or when the mobile station has move from an adjacent radio cell to the radio cell of the mobile station's fixed station respectively, all the frequencies of the organization channels which are to be measured by the mobile station concerned fixed station are announced. Thus, according to this embodiment, a mobile station located in the coverage area of the fixed station 1 (see FIG. 2) is thus informed of the frequencies of the organization channels of the adjacent fixed stations 3, 5, 7 and 9. In modem mobile radio systems, in which the speech signals are transmitted and received in compressed form in time slots, the mobile station has enough time between the time slots to be evaluated to tune to these frequencies and measure the radio engineering parameters, in this exemplary embodiment the received field strengths of the transmitted organization channels. Other radio systems in which continuous reception is to take place, should accordingly comprise a suitable additional receiver, especially to be inserted for measuring the desired radio engineering parameters. The measured parameters are sent back by the mobile station to its assigned fixed station.

The fixed stations of the embodiment as shown in FIG. 5 comprise a base station controller 51 in which, for example, the signals received from a mobile station 50 are split up into speech data and signalling data. The measured values SSD (Signal Strength Data) transmitted by the mobile station 50 are then separated from the signalling data and applied to a special evaluation unit 52. This evaluation unit is, for example, a microcomputer programmed as is shown in FIG. 6.

Figure 6:
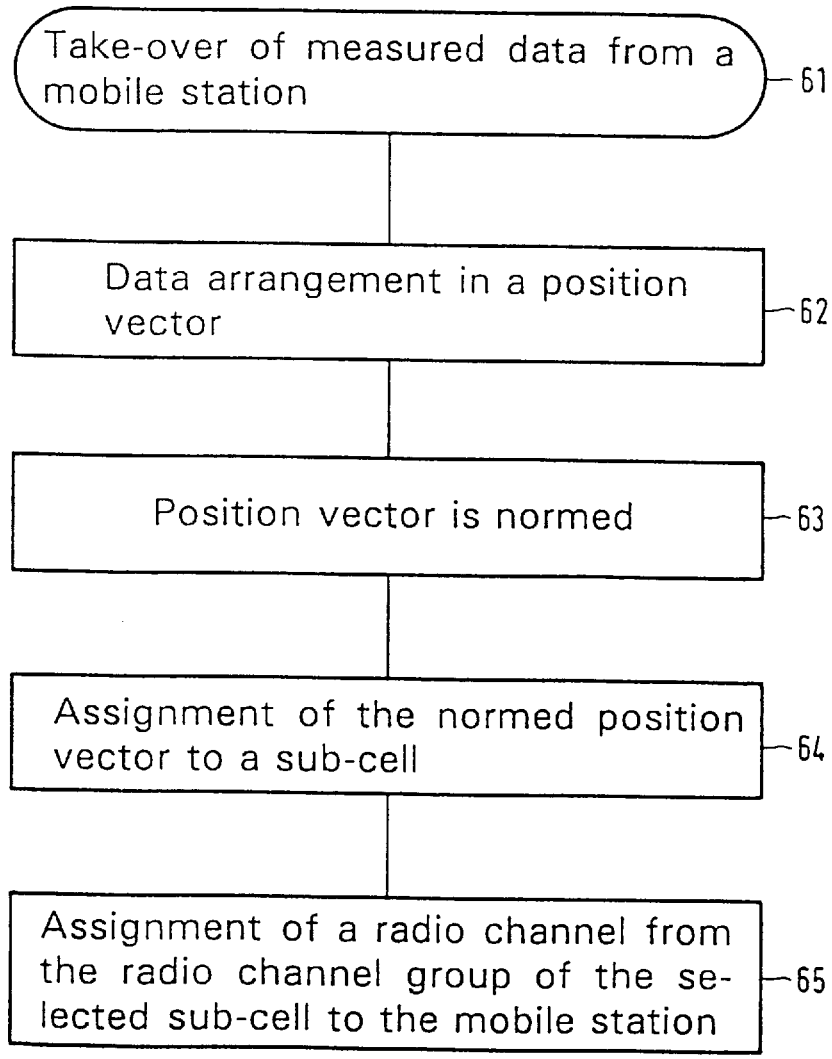
FIG. 6 shows processing steps in an evaluation unit and controller according to the invention for assigning a mobile station to a sub-cell.

Referring to FIG. 6, in the first step 61 the microcomputer takes over the measured data from the mobile station and arranges them to form a position vector (62). The order of this arrangement may be selected at random as such, but always the same order is to be used. In the exemplary embodiment the measurement results are selected in accordance with the numbering of the reference characters of the fixed stations:

(SSD(3), SSD(5), SSD(7), SSD(9)).

SSD(3) corresponds to the field strength with which the organization channel of fixed station 3 is received by the mobile station and so on.

The position vector ordered in this manner is then normed (63). For this purpose, each individual component of the position vector is divided by the receiving field strength SSD(1) with which the mobile station has received its own fixed station: (SSD(3)/SSD(1),SSD(5)/SSD(1), SSD(7)/SSD (1), SSD(9)/SSD(1)).

For an assignment of this normed position vector to a sub-cell (64), each normed element of the position vector is compared to a predetermined threshold value and a compatibility vector is computed. If the associated element of the position vector exceeds this threshold value, the element of the compatibility vector corresponding to the associated element of the position vector obtains the value of "1", otherwise the value of "0". Preferably, this threshold value is chosen to be equal to the value of said element at which the interchannel spacing is adequate for a radio connection without interference.

In the case of a compatibility vector with four elements, $2^4=16$ different compatibility vectors are thus possible purely from a point of view of computation, so that in the exemplary embodiment a distinction could be made between sixteen different sub-cells. If more threshold values are used, an arbitrarily high resolution can even be obtained. In the most simple case it is possible to provide for each compatibility vector its own selection of radio channels. Depending on the computed compatibility vector, a free radio channel assigned to the compatibility vector is then allocated to the mobile station.

To measure the real common channel interference, the fixed stations should actually all transmit on the same channel, and at best on the channel to be assigned. This can also be achieved with appropriate circuitry and cost. On the other hand, in the exemplary embodiment not the actual interchannel spacing was measured in an approximation, but the signal strength of one of the organization channels of a fixed station.

Since the frequencies of these organization channels are selected to be different, at least from adjacent radio cells, to avoid common channel interference, the exemplary embodiment utilizes the knowledge that in good approximation there may be assumed that the conditions of propagation of the organization channels in essence correspond to the conditions of propagation of the radio channels used. In this manner the cost of measuring the interchannel spacing of each channel to be selected can be reduced to the measurement of the interchannel spacing of each organization channel.

Figure 2:
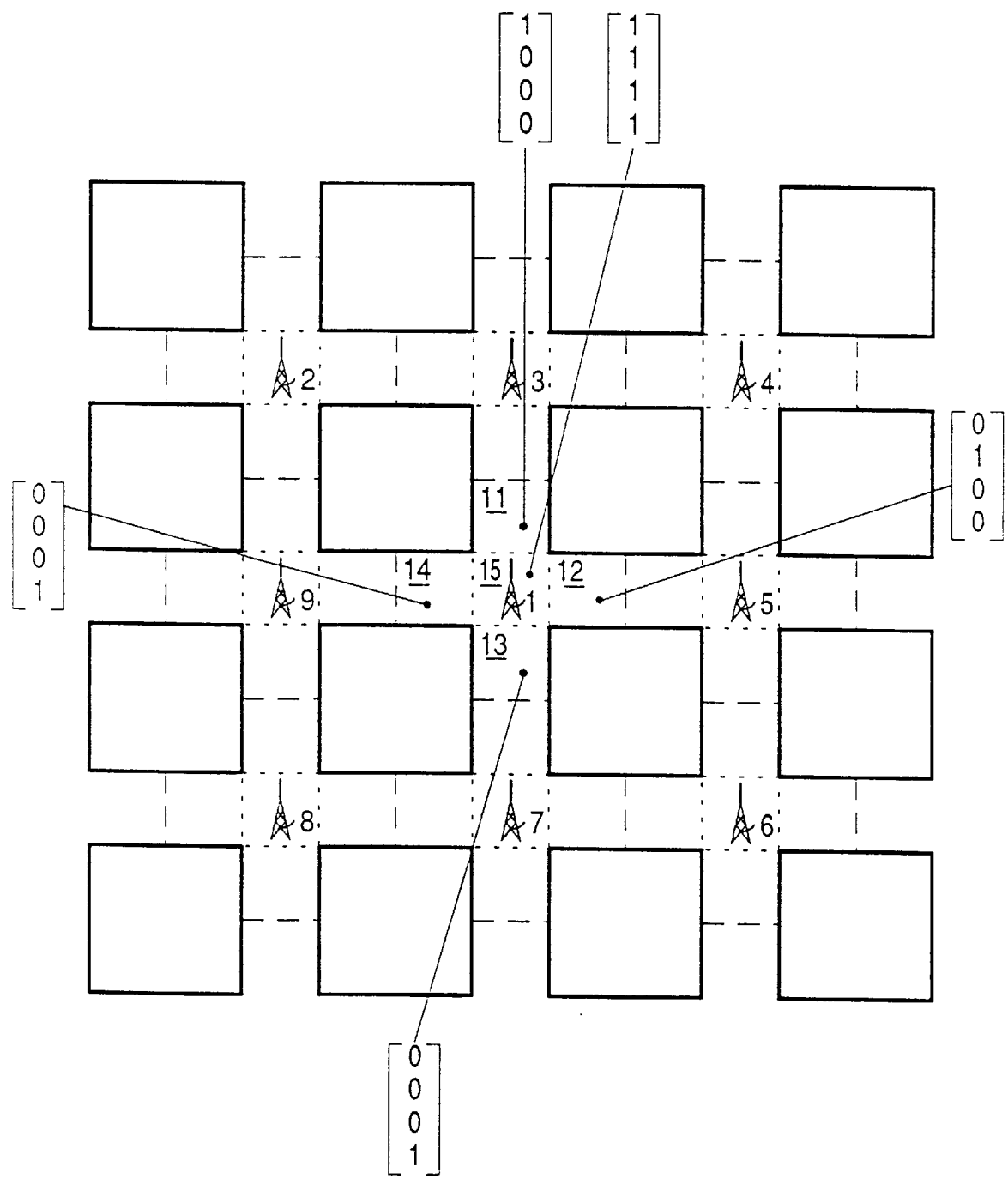
FIG. 2 shows a distribution of radio cells according to the Manhattan model.

The connection in practice between compatibility vector and sub-cell is shown in FIG. 2. This drawing Figure shows the same model as does FIG. 1 in which, however, each radio cell 1 is subdivided into five sub-cells 11 . . . 15. The boundaries of the sub-cells are shown in dotted lines in FIG. 2.

If, for example, there is a mobile station in the sub-cell 14, the distance to the fixed station 5 is so large that the interchannel spacing is equally large here. Due to the shielding effect of the adjacent buildings, also the interchannel spacing to the vertically adjacent mobile stations 3 and 7 is maintained accordingly. On the other hand, the interchannel spacing to the base station 9 is accordingly small, so that here a one is put in the associated vector in response to the measurements made by the mobile station. With the compatibility vector (0,0,0,1) an unambiguous assignment of the mobile station to this sub-cell is thus possible. Accordingly, there are other unambiguous compatibility vectors for the remaining sub-cells.

As observed hereinbefore, sixteen different compatibility vectors or sub-cells respectively, are possible with the embodiment chosen. In the model used, however, it is possible to have such cells with compatibility vectors with two ones only at places where adjacent radio stations are received with substantially equal power. Provided that there are ideal conditions of wave propagation along the streets, these places in the model would correspond to the places at which the buildings are located. Thus, the model shows from the beginning up to the transitions from one sub-cell to another the predominance of only compatibility vectors that have four ones for the middle sub-cell, and four compatibility vectors that have only a single one respectively, for the sub-cells lying around the middle cell.

These ideal conditions can be taken into consideration from the start for the radio network planning, for example, by an assignment Table as represented in FIG. 3. With the assignment Table shown in FIG. 3 the number of sub-cells appearing in theory is reduced to a limited number of sub-cells. The column K(i) of FIG. 3 lists all compatibility vectors. In the opposite column K'(i) a selected compatibility vector is assigned to each possible compatibility vector. The assignment Table shown in FIG. 3 is structured such that each compatibility vector comprising more than one one has assigned thereto a compatibility vector whose elements are all ones. In this manner the number of assigned compatibility vectors is restricted to five.

As a result of the assignment used, a specific sub-cell is unequivocally assigned to each street section of a radio cell. The sub-cells additionally assigned to the middle sub-cell in essence correspond to the sub-cells which come as radio locations in the buildings. If the radio traffic in the buildings is effected, for example, by a so-called in-house system, the sub-cells additionally assigned to the middle sub-cell make only an insignificant contribution to the radio traffic. With the same flow of radio traffic in vertical and horizontal directions, the traffic load in the radio cell is evenly distributed over all five sub-cells.

Figure 4:
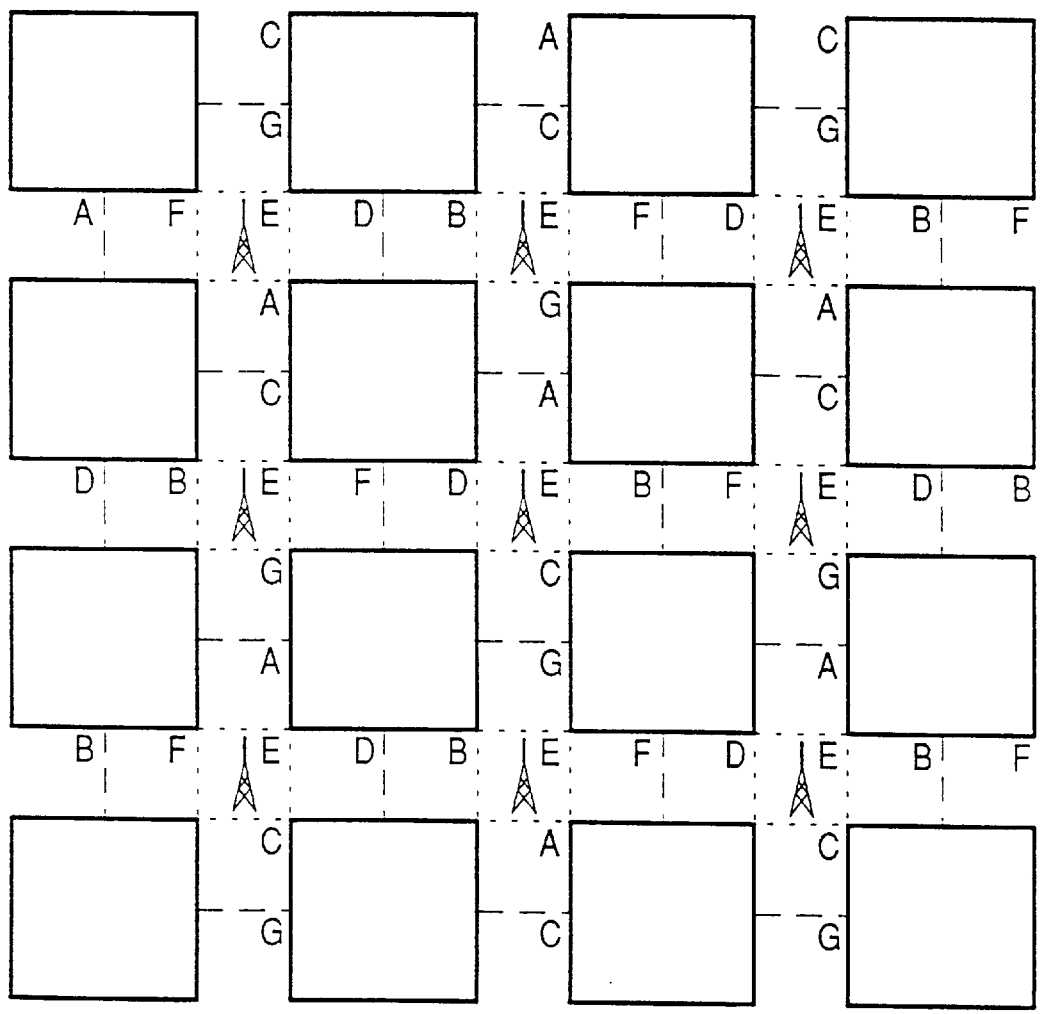
FIG. 4 shows a Manhattan model with radio channel distribution over classified sub-cells, FIG. 5 gives a schematic representation of a fixed station for a radio system according to the invention.

FIG. 4 shows a radio channel distribution plan in which each sub-cell is assigned one radio channel and thus each radio cell is assigned fifty radio channels. Because of the sub-cell formation only seven radio channel groups A . . . G with ten radio channels are from now on necessary for interference-free operation. By distributing the three radio channels saved in this manner over the whole mobile radio system, this model thus makes a considerable capacity increase possible of about 43% compared to the frequency division shown in FIG. 1. This capacity increase is at any rate higher than the gain one would obtain if the radio cells were subdivided into sub-cells, which subdivision is oriented to an interference gradient. If the ideal conditions of FIG. 4 are assumed with equidistant transmitters, which all transmit with the same transmitter power, all the sub-cells 11, 12, 13, 14 lying around the central sub-cell 15 would have the same interference quotient and thus not be mutually distinguishable.

Such ideal assumptions as are made with respect to the models can, of course, not be expected in reality. The advantage of the invention, however, lies in the fact that as a result of the assignment of the mobile stations an autonomous and unambiguous assignment to a sub-cell is possible via measured parameters. The sub-cells are even independent of the regional factors and are only determined by the radio properties of a sub-cell.

The autonomous assignment to a sub-cell makes it possible to include also topographical and morphological changes (such as, shadowing by a newly erected flat building and so on). Prominent topographical and morphological changes thus lead to a change of the sub-cell structure, because there is a different classification for specific radio locations, for example, due to a different compatibility vector.

In the exemplary embodiment considered henceforth, the received field strengths were only measured in the mobile stations. Since the radio attenuation between fixed station and mobile station does not depend on the direction, these measurements may also be made in the fixed stations. In that case a central storage and evaluation of the data is to be provided.

In this example the compatibility vector represents only the situation of downlink interference (downlink=direction from fixed station to mobile station) of a sub-cell. By storing and evaluating the received field strength factors at a central place, it is also possible that the situation of uplink interference (uplink=direction from mobile station to fixed station) occurs.

In a special embodiment of the invention a store is assigned to each possible sub-cell, in which store the number of calls made in this sub-cell are recorded. At the end of an evaluation period, for example, at the end of a week, sub-cells having little traffic load and preferably a similar interference situation are combined into a single sub-cell. Sub-cells having a similar interference situation are then obtained by evaluating and comparing the compatibility vectors of the sub-cells. Sub-cells which are combined have the same entry in the right column K'(i) of the assignment Table.

With the sub-cell information it is thus possible to adaptively arrange such a mobile radio system, so that the mobile radio system autonomously and from the beginning adjusts itself to the real demand and the real radio traffic situation. A self structuring radio system is especially advantageous in that generally, when a new radio system is taken into operation, the traffic load first increases only gradually, whereas the relative distribution of the traffic load over the individual sub-cells is made independently of the absolute number of radio users. In this manner an optimization of a new radio system can already be obtained in off-peak periods, while increased computational circuitry at the beginning, for example, for optimizing the assignment Tables, can be taken into account without any further problems.

Especially with such a self-adaptive radio system the operational reliability of microcell networks is enhanced, because the methods used so far in radio network planning have appeared to be certainly useful for microcells.

Furthermore, one has the possibility of determining the direction into which the mobile station moves within a radio cell, by comparing two time-consecutively determined position vectors, or compatibility vectors respectively. This information can be used in a manner known per se to make a decision for a radio cell handover. There may be decided, for example, whether a mobile station really moves into the direction of another radio cell or whether it only moves along the radio cell boundary. In the latter case a constant and unnecessary radio cell handover can be avoided with this information.

We claim:

1. A method of assigning a mobile station to a sub-cell in a cellular mobile radio system which comprises a plurality of radio cells which can be subdivided into sub-cells, each of said radio cells having a fixed base station to which a set of radio channels is allocated and which can be assigned by the base station to establish sub-cells of said cell, said method comprising steps of:

(i) measuring radio transmission parameters applicable to radio communication between the mobile station and the base station of each of a plurality of said cells that is adjacent to the one of said cells in which the mobile station is presently positioned;

(ii) forming, from said parameters, a position vector applicable to the respective sub-cells, said position vector being representative of a transmission quality between the base station of each of the adjacent cells and the mobile station, respectively;

(iii) based on the applicable position vector, selecting a sub-cell of said one of said cells to which the mobile station should be assigned in order to minimize interference by adjacent radio cells with radio transmission between the mobile station and the base station of the cell in which the mobile station is presently located; and (iv) assigning the mobile station to the selected sub-cell.

2. A method as claimed in claim 1, wherein said selecting step comprises the steps of:

comparing the respective parameters included in the position vector with respective threshold values applicable to the cellular mobile radio system, and deriving a compatibility vector from the position vector, in accordance with said comparisons;

and wherein said assigning step comprises the step of assigning the mobile station to said selected sub-cell of said plurality of sub-cells on the basis of the compatibility vector.

3. A method as claimed in claim 2, further comprising mapping the compatibility vector into a reduced set of assignment vectors on the basis of a logic conversion Table, and assigning the mobile station to said selected sub-cell of said plurality of sub-cells on the basis of the reduced assignment vector to which the compatibility vector mapped.

4. A method as claimed in claim 3, wherein one of the measured radio parameters is actual traffic load within each said sub-cell.

5. A method as claimed in claim 2, wherein the threshold values are altered in accordance with changes in operating conditions of the mobile radio system.

6. A method as claimed in claim 1, wherein the measured radio transmission parameters include a signal strength parameter.

7. A method as claimed in claim 6, wherein the measured signal strength parameters are normalized in relation to the measured signal strength of the base station of the radio cell in which the mobile station is positioned.

8. A method as claimed in claim 1, further comprising determining a direction of movement of the mobile station within said radio cell by comparing formed position vectors obtained at two consecutive times.

9. A method as claimed in claim 3, further comprising:

evaluating the set of assignment vectors;

based on the evaluated assignment vectors, determining revised radio channel distributions for sub-cells of the cell in which the mobile station is positioned; and assigning radio channels of said set of radio channels to said sub-cells in accordance with the revised radio channel distributions.

10. A method as claimed in claim 2 wherein said selected sub-cell is assigned, for the exclusive use of mobile stations located therein, its own frequency group of one or more frequencies from the frequencies available to the cell of said sub-cell.

11. A method as claimed in claim 4 wherein said selected sub-cell is assigned, for the exclusive use of mobile stations located therein, its own frequency group of one or more frequencies from the frequencies available to the cell of said sub-cell.

12. A method as claimed in claim 11 wherein said actual frequency load within each said sub-cell is determined from the usage of the frequencies of the frequency group of the sub-cell.

13. A method as claimed in claim 4 wherein the logic conversion Table takes into account the actual traffic loads of the sub-cells.

* * * * *